United States Patent [19]
Yang

[11] 3,773,412
[45] Nov. 20, 1973

[54] NON-REGULAR FIVE BLADE SHUTTER

[75] Inventor: Eugene Li-Chun Yang, McMurray, Pa.

[73] Assignee: Viewlex, Inc., Holbrook, N.Y.

[22] Filed: Dec. 2, 1970

[21] Appl. No.: 94,514

[52] U.S. Cl. ............................................. 352/219
[51] Int. Cl. ............................................. G03b 9/10
[58] Field of Search.................... 352/208, 219, 220

[56] References Cited
UNITED STATES PATENTS
2,052,960  9/1936  Berggren............................ 352/208
FOREIGN PATENTS OR APPLICATIONS
26,455  11/1915  Norway............................... 352/219
32,966  5/1911  Sweden............................... 352/219

Primary Examiner—Samuel S. Matthews
Assistant Examiner—Monroe H. Hayes
Attorney—James P. Malone

[57] ABSTRACT

A non-regular five blade shutter for motion picture projectors which provides a composite of a two blade shutter which gives maximum light, and a three blade shutter which provides minimum flicker. The present shutter transmits more light than a three blade shutter without undesirable light modulation or flicker.

5 Claims, 2 Drawing Figures

PATENTED NOV 20 1973

3,773,412

INVENTOR.
EUGENE LI-CHUN YANG
BY

NON-REGULAR FIVE BLADE SHUTTER

This invention relates to shutters for motion picture projectors, and more particularly, to a non-regular five blade shutter.

In motion picture projectors, two blade shutters transmit maximum light and three blade shutters provide minimum flicker. Various attempts have been made to get more light transmission from a three blade shutter by making it asymmetrical. However, this results in undesirable light modulation. The present invention provides a shutter whereby light is increased over a three blade shutter without undesirable side effects. The present invention bridges the gap between a three blade shutter and a two blade shutter. For instance, it can provide a shutter having light transmission equivalent to a 2.6 blade shutter without undesirable side effects.

A typical three blade shutter has blades each with an included angle of 50° which would give 210° of light exposure. The shutter of the present invention will give more light exposure than this without undesirable side effects such as light modulation and flicker, which are annoying to the viewer. The providing of more light lowers the power requirements for the projector.

Accordingly, a principal object of the invention is to provide new and improved shutter means for motion picture projectors.

Another object of the invention is to provide a new and improved five blade shutter for a motion picture projector.

Another object of the invention is to provide a new and improved shutter for motion picture projectors which transmit more light than a conventional three blade shutter without undesirable light modulation or flicker.

Another object of the invention is to provide a new and improved five blade shutter having a light transmission characteristic between that of a two blade shutter and that of a three blade shutter.

These and other objects of the invention will be apparent from the following specification and drawings, of which:

FIG. 1 is a generalized configuration for this invention. It is essentially a superposition of a three blade shutter, symmetrical about L1, L2 and L3, and each having S degrees) upon a four blade shutter symmetrical about L1 and Lh, and each having a degrees).

The angle C is measured over the actual composite shutter blade and is made equal to the pulldown angle of the indexing mechanism. The remaining four blades are here for anti-flicker and anti-modulation purposes.

The theory of operation is as follows: If $a = 0°$, then $S = C$ and the shutter degenerates into a regular three blade shutter. If $a = (C/2)°$ then $S = 0°$ and the shutter degenerates into a two blade shutter.

If $0° < a < (C/2)°$, then the shutter has five blades with both light output and flicker modulation characteristics somewhere between a conventional two blade and three blade shutters.

In actual design application, C is known, being governed by and equal to the pulldown mechanism angle. One is free to choose 'a' to obtain the desired light output. After choosing 'a', the other angles are given by the following equations:

$$S = C - 2a$$

$$B = S/2$$

Figure 1:
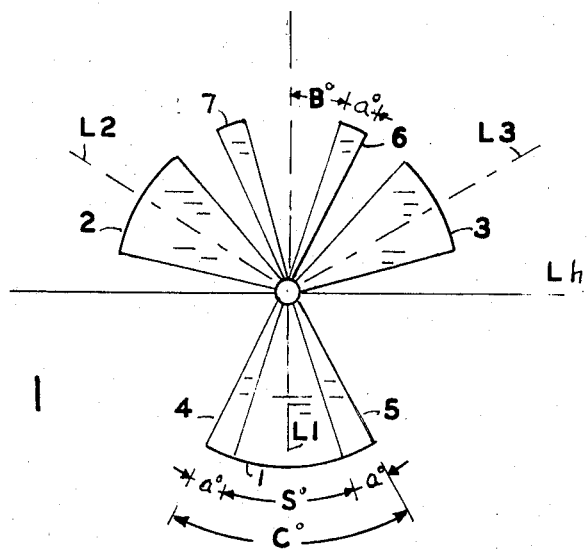
FIG. 1 is a plan view of an embodiment of the invention.

More specifically, referring to FIG. 1, the invention is a composite of a three blade shutter having blades 1, 2 and 3, each having an included angle of $S°$, and a four blade shutter comprising blades 4, 5, 6, and 7, each having an included angle of $a°$. The three blades 1, 2 and 3 are spaced 120° apart and the four blade shutter is symmetrical about the extended axis of blade 1. The blades 4 and 5 merge with the blade 1 to form a single blade which, together with the other four blades, constitute a non-regular five blade shutter. The angle 'a' may be chosen by experimentation for a particular application, and the other angles will then be given by the equations listed above. The angle C is a constant which is equal to the pulldown mechanism of the film advance, i.e., the angle of the film cycle wherein the film is being advanced.

Figure 2:
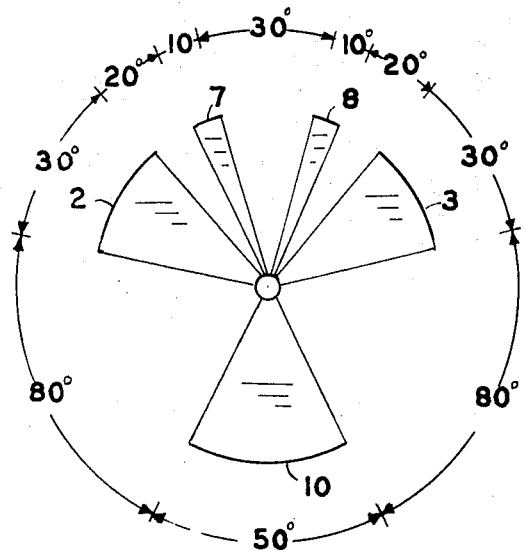
FIG. 2 is a plan view of an embodiment of the invention having equivalent light transmission characteristics of a 2.6 blade shutter.

Referring to FIG. 2, a specific example is given in the following. In FIG. 2, $a = 10°$ and $C = 50°$, then $S = 30°$ and the specific measurements are as shown. Blades 1, 4 and 5 merge into blade 10.

Having 230° of exposure, this shutter is equivalent to a shutter having 2.6 50°-blades in terms of light output When 2.6 = Ne = Number of equivalent blades in terms of light output. A two blade shutter has 260° of exposure while a three blade shutter has 210° of exposure. This shutter gives greater light than a three blade shutter, yet exhibits, subjectively, less temporal light modulation than a two blade shutter.

I claim:

1. A five blade shutter for a motion picture projector wherein $C°$ is the pulldown angle of the film indexing mechanism of said projector, comprising:

a first blade having an included angle of $C°$, second and third blades the axes of which oriented 120° on either side of the axis of said first blade, said second and third blades having an included angle of $S°$, fourth and fifth blades symmetrically located between said second and third blades, said fourth and fifth blades each having an included angle of $a°$, said fourth and fifth blades being spaced from the extended axis of said first blade by an angle $B$ where $$B = S/2$$

and $$C = S + 2a$$

2. Apparatus as in claim 1 wherein the equivalent number of blades Ne is between two and three and having the following parameters, $$a = C/2 \, (3 - Ne)$$

$$B = C/2 \, (Ne - 2)$$

$$S = C \, (Ne - 2)$$

3. Apparatus as in claim 2 wherein Ne = 2 forming a two blade shutter.

4. Apparatus as in claim 2 wherein Ne = 3 forming a three blade shutter.

5. Apparatus as in claim 2 wherein Ne = 2.6.

* * * * *